March 16, 1954 E. F. SCHWELLER 2,672,030
TWO-TEMPERATURE REFRIGERATING APPARATUS
Filed April 28, 1951 5 Sheets—Sheet 1

INVENTOR.
Edmund F. Schweller
BY
Willits Hardman and Fehr
attorneys

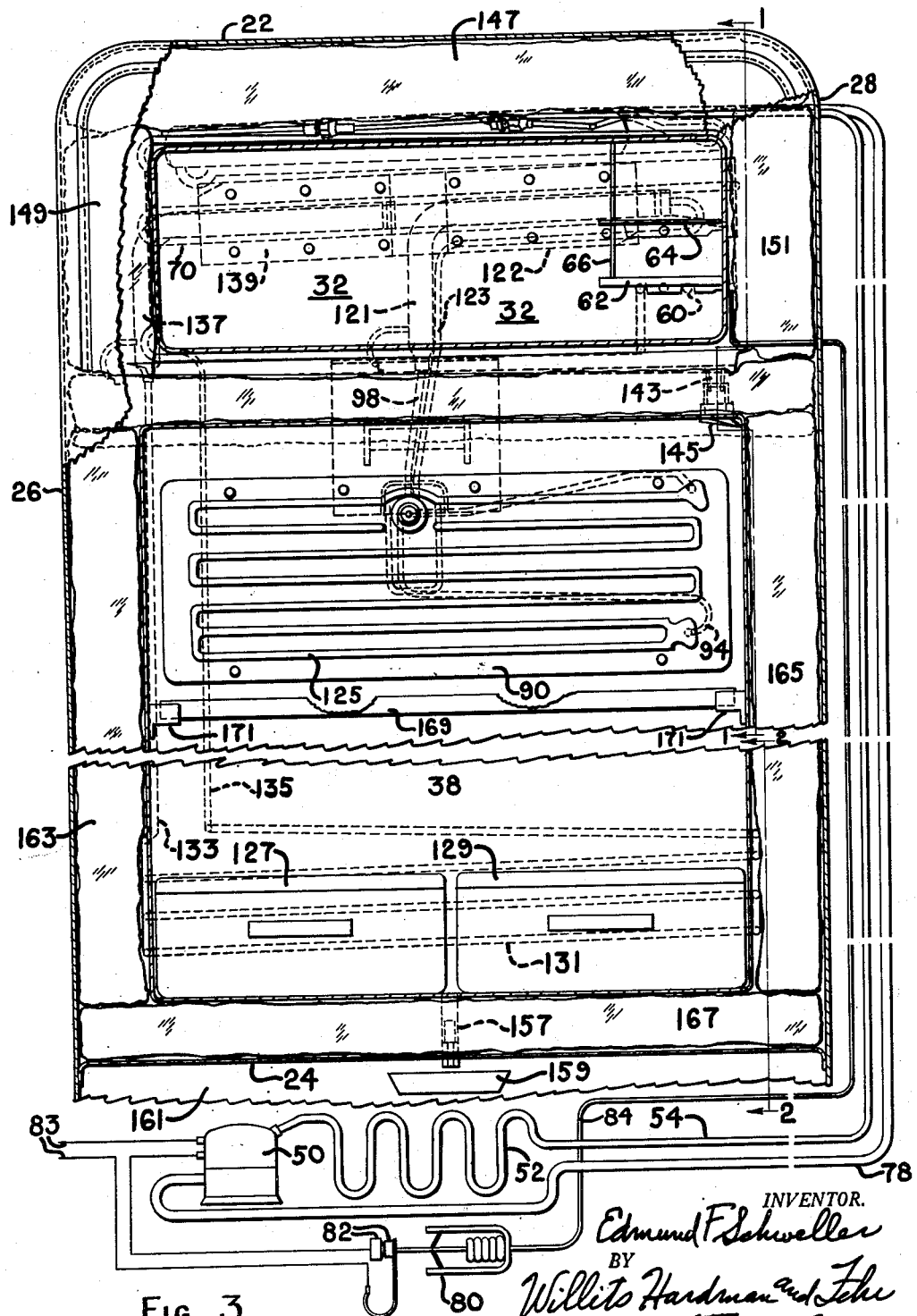

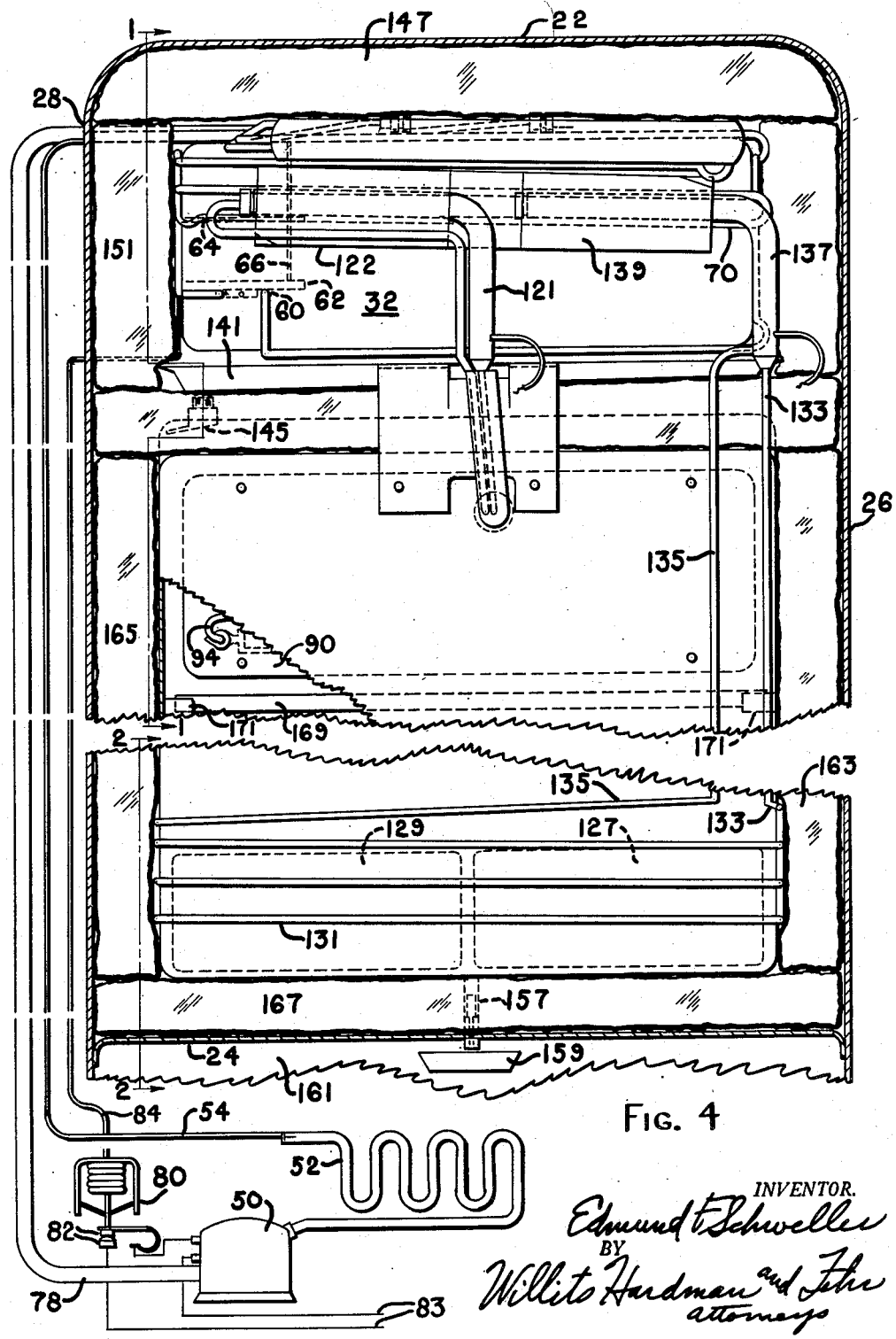

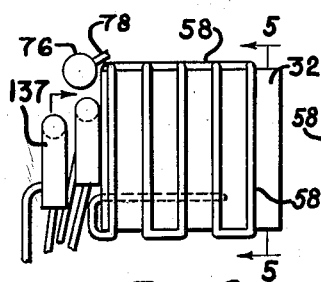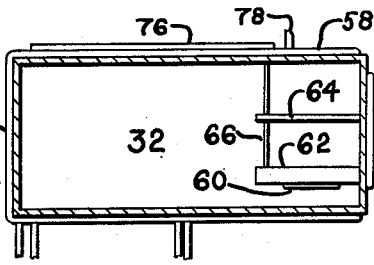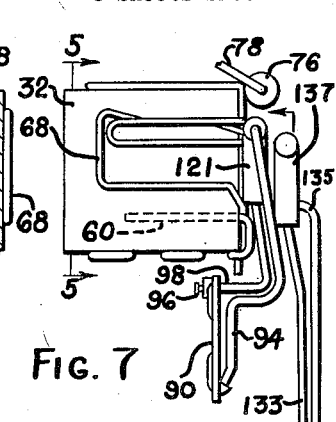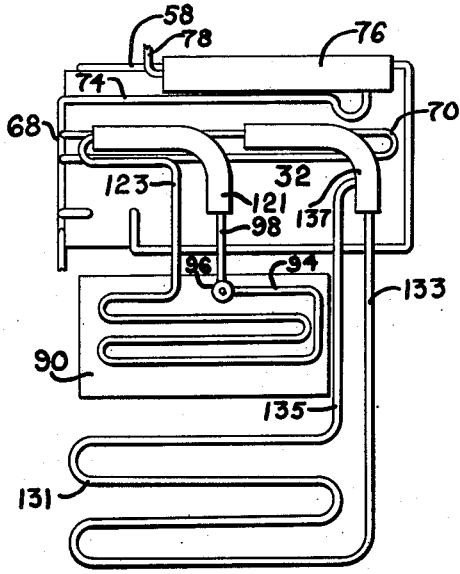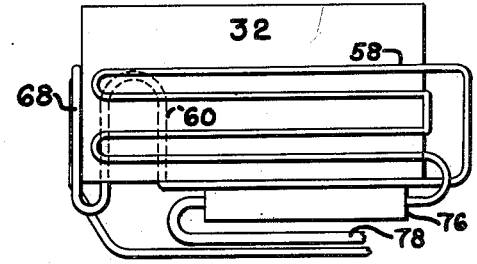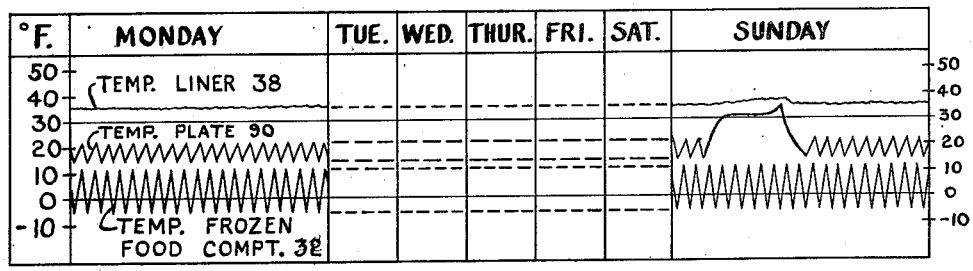

Patented Mar. 16, 1954

2,672,030

UNITED STATES PATENT OFFICE 2,672,030

TWO-TEMPERATURE REFRIGERATING APPARATUS

Edmund F. Schweller, Dayton, Ohio, assignor to General Motors Corporation, Dayton, Ohio, a corporation of Delaware Application April 28, 1951, Serial No. 223,531

4 Claims. (Cl. 62—117.3)

This invention relates to refrigerating apparatus.

An object of this invention is to provide an improved mechanical refrigerator which is adapted to be manufactured in large quantities and to be distributed and used throughout the United States. It is provided in its upper portion with a very low temperature frozen food compartment of rectangular cross section adapted to receive rectangular frozen food packages, to be fully packed with them, and to prevent local warm spots among such frozen food packages. The refrigerator is also provided with an unfrozen food compartment to be maintained at a low temperature, above 32° F., which compartment is adapted to receive foods in large quantities, which are to be maintained above 32° F., and which are not likely to be dehydrated. The refrigerator also is provided with a space within the unfrozen food compartment in which relatively high humidities are maintained and in which foods may be preserved which are likely to otherwise become dehydrated.

Notwithstanding these advantages, the refrigerator is adapted to operate satisfactorily in varying atmospheric temperatures ranging from below 50° F. to as high as considerably above 100° F. It is also adapted to operate satisfactorily in varying degrees of atmospheric humidity, frequently reaching substantially the saturation point of 100% relative humidity, without danger of accumulating undesirable moisture within the insulation surrounding the compartments.

To this end, the cabinet is provided with an outer casing which is substantially hermetically sealed throughout and is engaged by the door construction in a manner to reduce the infiltration of outside air into the refrigerator.

The frozen food compartment is virtually surrounded on all sides, except the door side, with a freezing evaporator placed on the outside of the compartment, and the inner side of the compartment is made smooth to receive the frozen food packages and to be easily scraped of a slight amount of frost which may gather after long periods of use. This compartment is adapted to be maintained cold without defrosting for relatively long periods of time (several months). Insulation is placed around the frozen food compartment made of hermetically sealed bags containing glass or mineral wool with the surfaces of the bags closely pressed against the outer surface of the frozen food compartment thereby blocking the access of moisture to the freezing evaporator to such an extent that only a slight amount of frost can ever gather on the outer surface of the frozen food compartment (the accumulation of which stops in the early days of operation) and cannot gather at all inside of the bags.

The unfrozen food compartment is also surrounded by similar bags of insulation pressed against the outer surface of the compartment so that no moisture whatever can gather inside the bags, and substantially no moisture can gather on the outer walls of the unfrozen food compartment. The lower portion of the unfrozen food compartment is surrounded and contacted by a refrigerant, pan cooling, evaporator which is in closed circuit relationship with a refrigerant condenser cooled by the freezing evaporator surrounding the frozen food compartment. This space, in the lower part of the unfrozen food compartment, is provided with one or more covered, humidity retaining, food receiving pans or drawers adapted to maintain a space at relatively low temperature and high humidity for storing of green vegetables and the like.

In order to cool the major portion of the unfrozen food compartment, and in order to prevent the accumulation of moisture either inside of the unfrozen food compartment or in the insulation space, a frosting and defrosting evaporator is placed inside of the unfrozen food compartment and is preferably in the shape of a vertical rectangular plate, in the upper rear part of the unfrozen food compartment. This frosting and defrosting evaporator may be cooled by placing it in closed refrigerant flow relationship with a condenser cooled by the freezing evaporator surrounding the frozen food compartment. The outer surface of the frosting and defrosting evaporator is colder than the outer surface of the pan cooling evaporator and hence continually freezes moisture from the insulation space and prevents any material accumulation within it.

A motor compressor unit and condenser are placed in the lower part of the refrigerator and are in refrigerant flow relationship with the freezing evaporator. The compressor is cycled frequently (at least several times a day) to maintain the desired temperature conditions in the refrigerator and this is accomplished by providing a thermostatic switch having its thermostatic bulb closely adjacent the condenser which is in refrigerant flow relationship with the frosting and defrosting evaporator.

This refrigerator is adapted to maintain the frozen food compartment uninterruptedly below 32° F. without defrosting for long periods of time, such as several months, by the normal cycling of the motor compressor unit, which cycling occurs several times an hour. The refrigerator may be easily maintained in proper condition by occasionally and quickly defrosting the frosting and defrosting evaporator, which operation may be performed so quickly that no melting can take place in the frozen food compartment. The refrigerator can operate at very high efficiency in all sections of the country under varying conditions of atmospheric temperature and humidity without becoming frost or moisture bound either within its food preserving compartments or within its insulation space.

Further objects and advantages of the present invention will be apparent from the following description, reference being had to the accompanying drawings, wherein a preferred form of the present invention is clearly shown.

In the drawings:

Fig. 3 is a fragmnetary front vertical sectional view taken substantially along the line 3—3 of Figs. 1 and 2;

Fig. 4 is a fragmentary rear vertical sectional view taken substantially along the line 4—4 of Figs. 1 and 2, with the back insulation removed;

Fig. 5 is a front sectional view partly diagrammatic taken substantially along the line 5—5 of Figs. 6 and 7 of the freezing compartment and the freezing evaporator;

Fig. 6 is an exploded left side view of the freezing compartment and evaporator shown in Fig. 5 including the two secondary condensers and the accumulator;

Fig. 7 is an exploded right side view of the freezing compartment shown in Fig. 5 with the secondary cooling coils for the high humidity compartment and the frosting and defrosting evaporator plate being added;

Fig. 8 is a bottom view of the freezing compartment shown in Fig. 5;

Fig. 9 is a back view of the freezing compartment and the other two evaporators, and Fig. 10 is a temperature time chart of the three evaporators in the cabinet.

Figure 1:
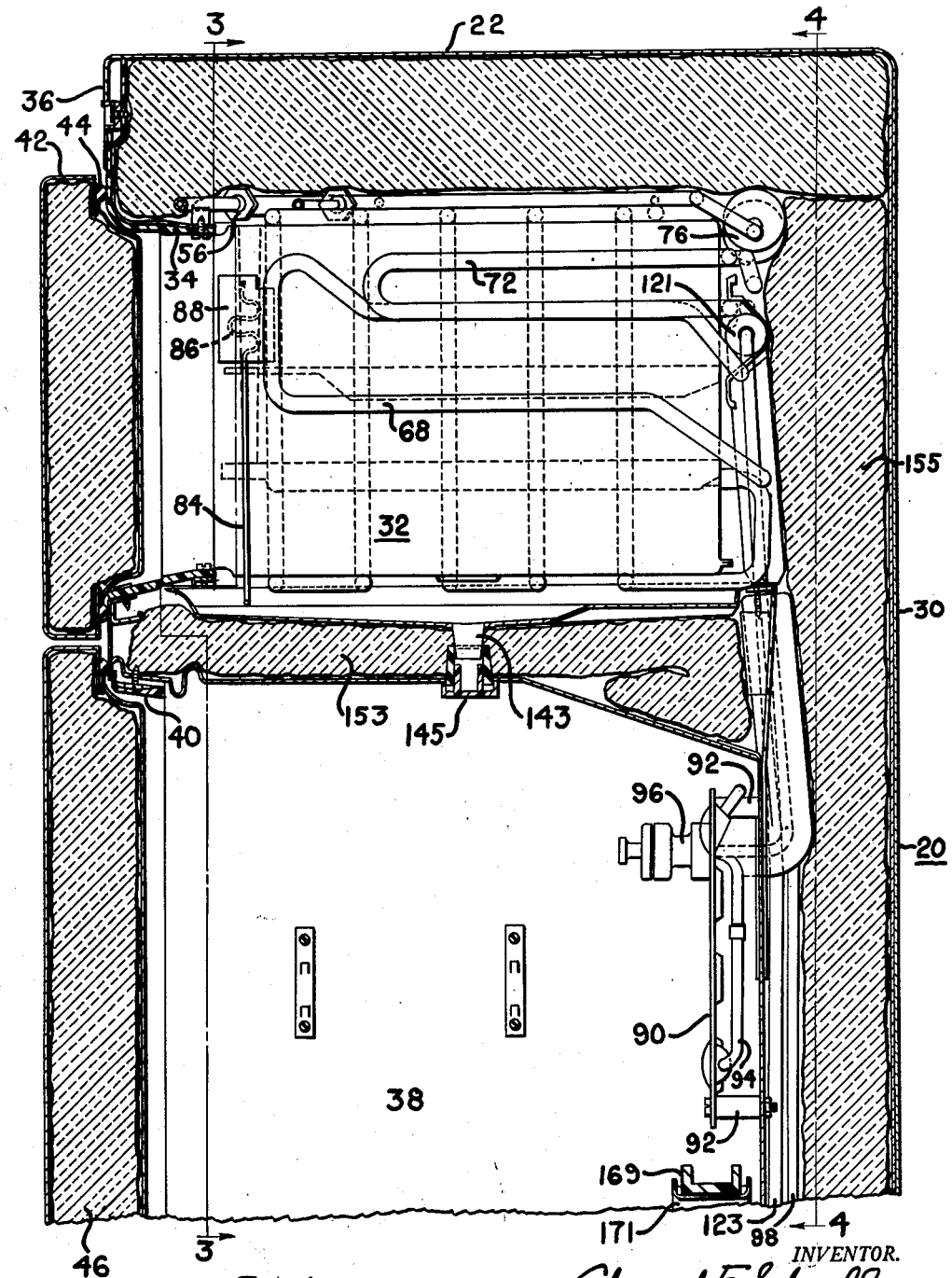
Fig. 1 is a vertical sectional view taken substantially along the line 1—1 of Fig. 3, with the side insulation removed, of the upper portion of a two temperature refrigerator embodying one form of my invention.
Figure 2:
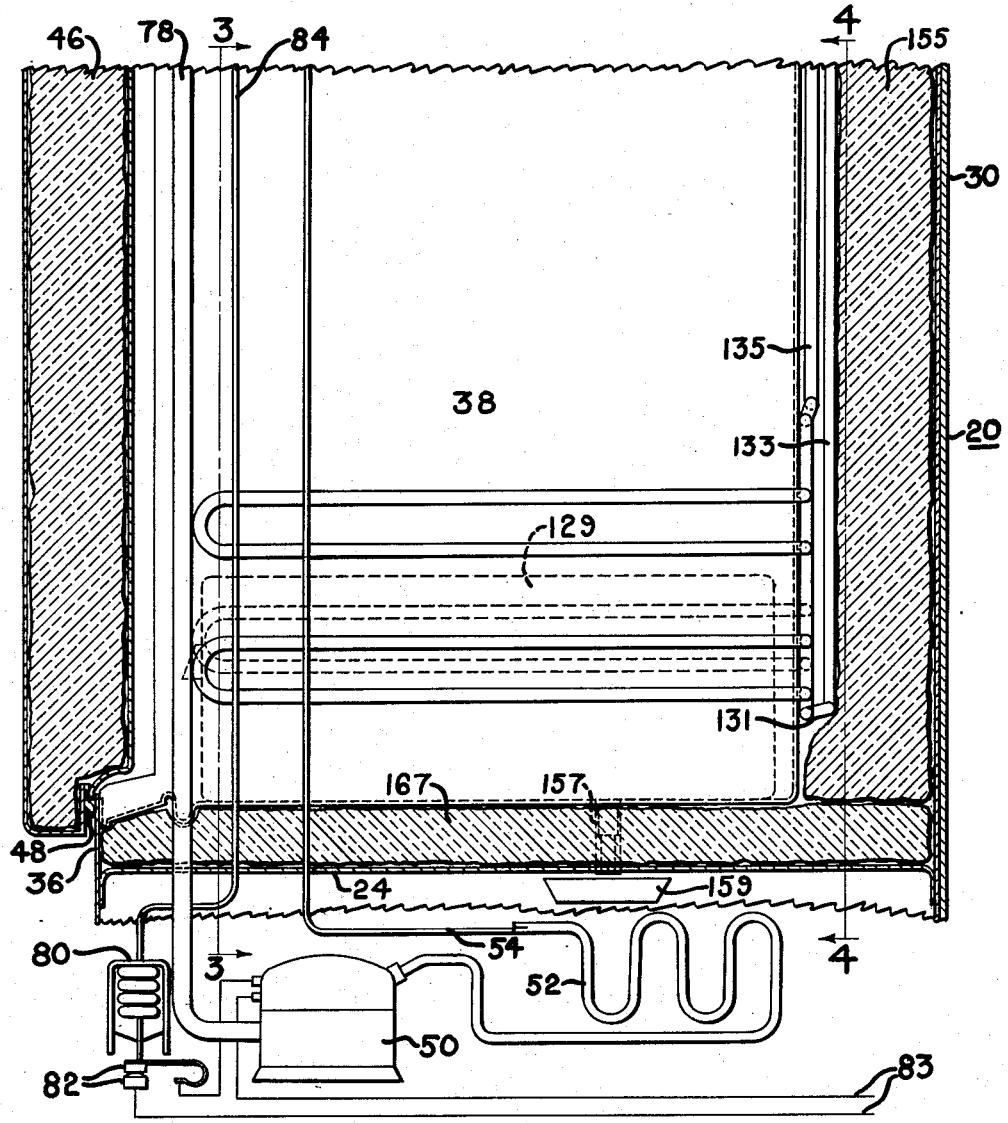
Fig. 2 is a vertical sectional view taken substantially along the line 2—2 of Fig. 3, with the side insulation removed, of the bottom portion of the two temperature refrigerator, the upper portion of which is shown in Fig. 1.

Referring now to the drawings, there is provided an outer sheet metal cabinet shell 20 enclosing the top 22, bottom 24, sides 26 and 28, and rear 30 of the cabinet which is hermetically sealed. The joints of this shell 20 are sealed by welding or other suitable metal seal and preferably are double sealed on the interior by the use of some form of non-metallic sealing material such as an asphalt applied in molten form.

There is provided a freezing compartment 32 in the upper portion of the cabinet in the form of a box-shaped metal container having its front side open. This compartment container 32 has its front edges connected by a member 34 of a thermoplastic material, called a breaker strip or throat, to the front portion 36 of the outer shell 20 of the refrigerator. Beneath the freezing compartment container 32 there is provided a food compartment 38 in the form of a box-shaped metal container having its front side open. The front edges of this box-shaped container 38 forming the food compartment are connected by breaker strip or throat 40 of a thermoplastic or other suitable poor heating conduit material with the front wall 36 of the outer shell 20. A separate upper door 42 containing insulation is provided for the freezing compartment 32 and is provided with a seal 44 of a suitable synthetic rubber which extends entirely around the door 42 to make sealing engagement with the front 36 of the outer shell 20 so that when the door 42 is closed the freezing compartment 32 is substantially sealed from outside air. The lower food compartment 38 is provided with a separate door 46 containing somewhat less insulation than the door 42. It is likewise provided with a similar seal 48 extending entirely around the door which makes sealing engagement with the front 36 of the outer shell 20. This seals the food compartment 38 from the outside air. The sealing of the doors 42 and 46 against the front side 36 of the outer shell 20 completes the hermetical sealing of the outside of the cabinet so that no air and moisture can enter the cabinet except by opening one of the doors.

The freezing compartment 32 is provided with smooth inner wall surfaces so that any snow or frost accumulating therein can be easily scraped or brushed off. When no melting occurs, such snow and frost will not adhere tightly to the surface of the freezing compartment 32. The freezing compartment 32 is cooled by a primary refrigerating system which includes a sealed motor compressor unit 50 which delivers compressed refrigerant to a condenser 52 both of which are located in a machine compartment beneath the bottom wall 24 of the cabinet.

The condenser 52 delivers liquid refrigerant through a capillary tube restrictor 54 to the inlet connection 56 of a tubular evaporator which includes a section of serpentine tubing 58 wound in serpentine fashion over the top, left side and bottom of the freezing compartment 32 after which there is a refrigerated loop 60 extending through the back wall of the compartment 32 forwardly, beneath, and in contact with the bottom of the ice tray shelf 62 for providing for fast freezing of ice in an ice tray. The shelf 62 is beneath another shelf 64, both of which are supported upon the side wall and by a connection 66 from the top of the freezing compartment container 32. From the loop 60, the evaporator tubing extends in the form of a loop 68 upon the right side wall of the freezing container 32. The evaporator tubing then extends in the form of a loop 70 across the back wall of the freezing compartment container 32, after which there is another loop 72 provided on the right side wall of the freezing compartment container 32 which connects with a connection 74 across the back wall of the freezing compartment container 32 which ends in a trap connecting to the bottom of an accumulator or tank 76 located in contact with the upper rear edge of the freezing compartment container 32. The upper portion of the accumulator 76 is connected by the suction conduit 78 with the inlet of the compressor 50.

A thermostatic control switch 80 is provided and disclosed in diagrammatic form. It includes contacts 82 connected in series with one of the supply conductors 83 which conduct electrical energy to the motor compressor unit 50. Preferably, this switch is of the type shown in the Grooms Patent No. 2,351,038 and has a temperature sensitive element in the form of a capillary tube 84 which ends in a serpentine portion 86 clamped by a clamp 88 to the right side wall of the freezing compartment container 32 in direct intimate thermal contact with the vertical portion of the refrigerant evaporator loop 68. The thermostat 80 is set to close at about plus 12° F. and to open at about minus 4° F. to maintain an average temperature near 0° F.

In prior refrigerators of this general type, it has been customary to cool the food compartment 38 entirely by a secondary evaporating means wrapped around the walls of the liner of the food compartment. This resulted in very high humidity within the food compartment. This high humidity was objected to by many users. Since there was no way of providing a perfect seal between the interior of the food compartment 38 and the insulation space surrounding the food compartment 38 there was a tendency for the moisture to be carried to the coldest adjacent point. This caused moisture vapor diffusing into the insulation space to condense on the secondary evaporator tubing used for cooling the food compartment and some of this condensed moisture collected in the bottom of the insulation space.

To overcome this objectionable circumstance I provide a vertical plate-type refrigerant evaporator 90 within the food compartment 38. This is fastened by bolts and spacers 92 to the rear wall of the cabinet near the upper portion thereof leaving a small space between the plate 90 and the rear wall of the cabinet to permit a column of air to flow downwardly therebetween. The bottom of this plate 90 is connected by tubing 94 to a manually operable snap-action valve 96 mounted upon the plate 90. The other side of the valve 96 is connected by a conduit 98 with the bottom of a bent condenser 121. This condenser 121 is clamped by a plate 122 in contact with the upper portion of the refrigerant evaporator loop 70 on the back wall of the freezing compartment 32. The top of the condenser 121 is connected by a refrigerant conduit 123 with the top of the refrigerated plate 90 to complete the secondary refrigerant circuit which is charged with a suitable amount of refrigerant. The refrigerated plate 90 is provided with serpentine refrigerant passages 125 extending from its inlet to its outlet as best shown in Fig. 3.

The loop 70 on the back wall of the freezing compartment 32, with which the condenser 121 is in contact, is somewhat warmer than other portions of the primary evaporator. There is a certain amount of temperature differential between the condenser 121 and the refrigerated plate 90 so that the refrigerated plate 90 is kept at a higher temperature normally than the freezing compartment 32 and the evaporating coils thereon as shown in the charts constituting Fig. 10. As shown by the chart, the refrigerated plate varies in temperature normally between about 16° and 22° F. With the size of plate shown, this provides adequate refrigeration for the greater portion of the food compartment 38. It also keeps the humidity within the food compartment 38 sufficiently low to avoid objection from users. When it is desired to defrost this evaporator, the defrost is readily done by pushing a button provided upon the front of the valve 96. This will shut off the supply of liquid from the bottom of the condenser 121 to the bottom of the refrigerated plate 90, thereby causing a slowing down of condensation in the condenser 121 and a consequent rise in temperature of the plate 90 as shown on the portion of the chart marked "Sunday" which continues until the refrigerated plate 90 defrosts. After this, the button on the front of the valve 96 is pulled out to open the valve and the refrigerated plate 90 resumes normal cycles since the circulation of refrigerant within this secondary refrigerant circuit is restored. The variations in temperature of the refrigerated plate 90 during normal operation is due to the variations in temperature of the primary evaporator due to the cycling of the motor compressor unit under the control of the switch 80.

The bottom of the food compartment is provided with two covered pans 127 and 129 to keep food at a high humidity. These pans 127 and 129 are conveniently arranged to pull out as drawers. Since these pans are substantially closed it is necessary to provide additional cooling so that the food within these pans is kept at a suitable refrigerating temperature. For this purpose there is wrapped about the sides and back of the liner for the food compartment 38 in serpentine fashion, the tubing 131 which constitutes the evaporator of another secondary refrigerant circuit which includes the connecting conduits 133 and 135 which are connected to the bent secondary condenser 137 which is clamped along with the condenser 121 to the loop 70 upon the rear wall of the freezing compartment container 32 by a clamping plate 139. This secondary condenser 137 condenses refrigerant at a rate to provide sufficient evaporation of the refrigerant in the evaporator tubing 131 to keep the portion of the food compartment liner 38 adjacent the pans 127 and 129 at a temperature between about 34° and 36° F.

Moisture vapor tends to migrate to the coldest surface to which it has access. If the insulation spaces between the food compartment liner 38 and the freezing compartment container 32 within the outer shell 20 were filled with ordinary mineral or glass wool in a substantially homogeneous arrangement without any moisture vapor barriers, the moisture vapor would all tend to collect in the form of frost or snow upon the external surface of the primary evaporator surrounding the freezing compartment container 32. The container 32 is provided with a drain (not shown) which drains into a catch pan 141 directly beneath the primary evaporator 32 so that if it is desired to completely defrost the refrigerator, the frost and snow can be removed as it melts and will be caught by the catch pan 141. This catch pan 141 is provided with a drain outlet 143 which extends into the food compartment 38 and is provided with a spout 145 for discharging the defrosting water onto the vertical side wall of the food compartment liner 38.

However, to keep to a minimum the amount of frost collecting upon this primary evaporator surrounding the freezing compartment container, I have placed the insulation such as glass or mineral wool into sealed bags of some suitable thermoplastic material such as polyethylene, or polyvinylidene chloride. Such materials are substantially moisture impermeable and prevent substantially any leakage of moisture vapor into the interior of the bag containing the glass or mineral wool. These bags, such as a bag 147 in the space above the freezing compartment 32 and the bags 149 and 151 in the spaces at the sides of the freezing compartment container 32 and the bag 151 between the catch pan 141 and the top of the food compartment liner 38 as well as the bag 155 which fills the insulation space at the rear wall of the cabinet closely envelop the freezing compartment container 32 and the evaporator surrounding it so that the access of moisture to these cold surfaces is blocked so well that substantially no moisture can get to this surface. The material forming the bags is very flexible and resilient and the glass or mineral wool used inside these bags is likewise very flexible and resilient so that the bags hug and surround the freezing container 32 and the primary evaporator very closely, so that access to these surfaces through the insulation space is almost completely blocked.

Since the moisture vapor is prevented from having access to the coldest surface in the refrigerator cabinet, the vapor then migrates to the next coldest surface which is the surface of the refrigerated plate 90 which is normally kept at a temperature varying between about 16° and 22° F. as shown by the chart in Fig. 10. From a practical standpoint it is impossible to perfectly seal the inner walls of the insulation space. Therefore no attempt is made to seal such walls and as a result breathing openings or leakage accesses occur between the interior of the food compartment liner and the insulation space to provide a path for the migration of moisture vapor. This migration is sufficient to prevent moisture from condensing on the evaporator coils 131 of the other secondary evaporator. This expedient therefore keeps the insulation space surrounding the food compartment liner 38 substantially dry. However, as an added precaution, these lower insulation spaces are likewise filled with mineral or glass wool in the sealed bags 163, 165 and 167 as described for the bags surrounding the freezing compartment container 32.

When the refrigerated plate 90 is defrosted, the water forming as a result of the melting of the frost is collected by the drip trough 169 supported by the brackets 171 on the walls of the liner 38. These brackets discharge the defrost water onto the walls of the liner so that it is conducted to the bottom of the food compartment liner 38. Any water upon the bottom of the food compartment liner 38 is conducted by a drain 157 to a pan 159 in the machine compartment 161. Here the pan 159 will be heated sufficiently by its proximity to the motor compressor 50 into condenser 52 then the moisture will be evaporated therefrom.

This application is related to application S. N. 223,532 filed concurrently herewith.

While the form of embodiment of the invention as herein disclosed, constitutes a preferred form, it is to be understood that other forms might be adopted, as may come within the scope of the claims which follow.

What is claimed is as follows:

1. Refrigerating apparatus including an insulated cabinet provided with an outer hermetically sealed shell, a box-shaped metal container within said cabinet enclosing a frozen food compartment, the walls of said container being provided with refrigerant passages, the insulation surrounding the frozen food compartment being in hermetically sealed bags in sufficiently close contact with the freezing evaporator to substantially block the access of moisture thereto, a box-shaped metal liner within said cabinet enclosing an unfrozen food compartment, a refrigerant liquefying means for supplying liquid refrigerant to and for withdrawing evaporated refrigerant from said refrigerant passages, a first secondary refrigerant circuit having an evaporating portion in direct heat exchange relation with said metal liner and having a condensing portion in heat exchange relation with said container, a second secondary refrigerant circuit having a vertical refrigerant plate evaporating portion located inside said liner and having a condensing portion in heat exchange relation with said container, said vertical refrigerant plate reducing the relative humidity in said food compartment.

2. Refrigerating apparatus including an insulated cabinet provided with an outer hermetically sealed shell, a box-shaped metal container within said cabinet enclosing a frozen food compartment, the walls of said container being provided with refrigerant passages, a box-shaped metal liner within said cabinet enclosing an unfrozen food compartment, a refrigerant liquefying means for supplying liquid refrigerant to and for withdrawing evaporated refrigerant from said refrigerant passages, a first secondary refrigerant circuit having an evaporating portion in direct heat exchange relation with said metal liner and having a condensing portion in heat exchange relation with said container, a second secondary refrigerant circuit having a vertical refrigerant plate evaporating portion located inside said liner and having a condensing portion in heat exchange relation with said container, said vertical refrigerant plate reducing the relative humidity in said food compartment, a catch pan beneath said freezing compartment container extending substantially to the edges thereof, a drip pan located beneath said vertical plate evaporating portion, and liquid discharging means for said pans for discharging the liquid onto the inner surface of said liner.

3. A refrigerating apparatus comprising: a cabinet including an outer casing; a motor compressor unit and a condenser in said cabinet; a frozen food compartment in said cabinet to be maintained substantially below 32° F. without defrosting for long periods of time, such as several months, independently of the cycling of said motor compressor unit; an unfrozen food compartment to be maintained substantially above 32° F.; insulation inside said outer casing and outside and between said compartments with access to said unfrozen food compartment; a freezing evaporator in contact with walls of said frozen food compartment; the insulation surrounding the frozen food compartment and said freezing evaporator being in hermetically sealed bags in sufficiently close contact with the freezing evaporator to substantially block the access of moisture thereto, a frosting and defrosting evaporator inside said unfrozen food compartment; a humidity maintaining evaporator surrounding the lower portion of said unfrozen food compartment; refrigerant flow and heat exchange connections between said evaporators and said motor compressor unit and condenser; a defrost water catch pan beneath the walls of said frozen food compartment for collecting defrost water from said freezing evaporator; and means for discharging said defrost water into said unfrozen food compartment.

4. A refrigerating apparatus comprising: a cabinet including an outer casing; a motor compressor unit and a condenser; a frozen food compartment in said cabinet to be maintained substantially below 32° F.; an unfrozen food compartment to be maintained substantially above 32° F.; insulation inside said outer casing and outside and between said compartments; a freezing evaporator in contact with walls of said frozen food compartment; the insulation surrounding the frozen food compartment and said freezing evaporator being in hermetically sealed bags in sufficiently close contact with the freezing evaporator to substantially block the access of moisture thereto, a frosting and defrosting evaporator inside said unfrozen food compartment; a humidity maintaining evaporator surrounding the lower portion of said unfrozen food compartment, refrigerant flow connections between said evaporators and said motor compressor unit and condenser; and a defrost water catch pan beneath the walls of said frozen food compartment for collecting defrost water from said freezing evaporator; and means for discharging said defrost water from said catch pan.

EDMUND F. SCHWELLER.

References Cited in the file of this patent

UNITED STATES PATENTS

| Number | Name | Date |
|---|---|---|
| 1,798,951 | Munter | Mar. 31, 1931 |
| 1,952,448 | Maloney | Mar. 27, 1934 |
| 2,076,277 | Reinhart | Apr. 6, 1937 |
| 2,293,360 | Reilly | Aug. 18, 1942 |
| 2,314,657 | Norris | Mar. 23, 1943 |
| 2,487,182 | Richard | Nov. 8, 1949 |